Aug. 30, 1932.  A. SIMONE  1,874,820
CONVERTIBLE STORE FRONT
Filed Aug. 21, 1931  2 Sheets-Sheet 1

INVENTOR
A. Simone
BY E. J. Featherstonhaugh
ATTORNEY

Aug. 30, 1932.  A. SIMONE  1,874,820
CONVERTIBLE STORE FRONT
Filed Aug. 21, 1931  2 Sheets-Sheet 2

Patented Aug. 30, 1932

1,874,820

UNITED STATES PATENT OFFICE

ANDREA SIMONE, OF TORONTO, ONTARIO, CANADA

CONVERTIBLE STORE FRONT

Application filed August 21, 1931. Serial No. 558,509.

The invention relates to a convertible store front, as described in the present specification and illustrated in the accompanying drawings which form a part of the same.

The invention consists essentially in a knockdown display front replacable under seasonable conditions by a night closure as pointed out in the claims for novelty following a description in detail of one manner of carrying out the invention.

The objects of the invention are to open out during the warmer weather the complete front of the store and turn what was originally a closed store with a display front to something in the nature of a market stall where the customers can saunter in and view the goods, which is particularly valuable in the sale of fruit and vegetables and other food stuffs though for novelty and even staple goods it will prove of great value especially for demonstration purposes; to construct a store front for the window display so as to take it down with comparative ease and store it on the premises or elsewhere if desirable and leave a complete open front closeable at night by a reliable gate which is necessarily collapsible for day purposes; to facilitate the disposal of all kinds of wares by attractively offering them to the public with practically no bar of any kind towards reaching them and at the same time enable the prospective purchaser to pass along in front of the assorted goods without necessarily hunting or handling any particular wares; and generally to provide at a minimum cost to the merchant a means of opening out widely the salesroom for the benefit of the public and to the advantage of the merchant in the gaining of profits by the encouragement of the sales.

In the drawings, Figure 1 is a front elevational view of the store showing the window display style for the more inclement weather conditions.

Like numerals of reference indicate corresponding parts in the various figures.

Figure 1:
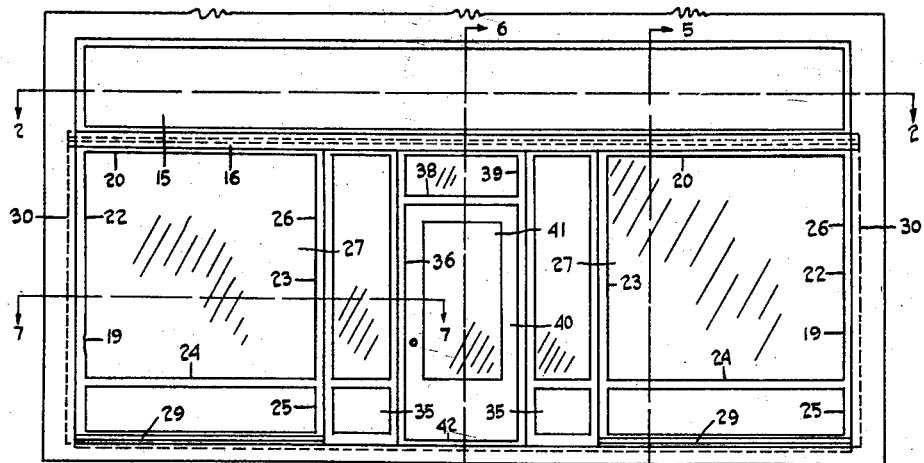
Figure 2:
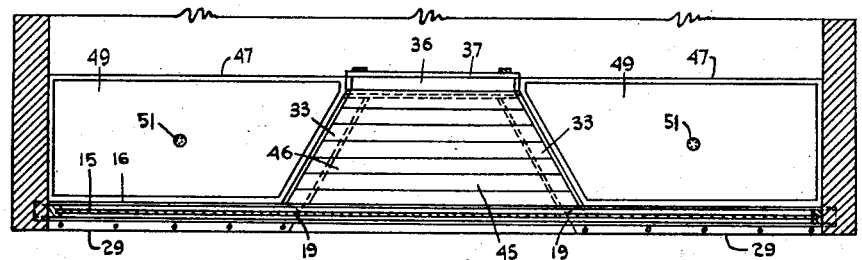
Figure 2 is a cross sectional view on the lines 2—2 in Figure 1.

Referring to the drawings, either the stall type or window front type is preferable, the main transom indicated by the numeral 15 extends completely across the store front at the upper end and is a permanent fixture and this transom may be of any form desired, such as leaded glass, colored glass or something in the nature of a design for beautiful effects are reached in the ornamentation of stores through the adaptation of this type of closure at the upper end of the store front.

This transom in the present invention preferably rests on a cross beam or bar 16, in fact it may, if desirable be grooved into this stiff beam as shown at 17, the longitudinal groove 18 being arranged in the underside of the beam. It will of course be understood that this beam is a permanent affair and may be of the type known as an I-bar in steel which will provide the necessary grooves and at the same time the structural strength which is necessary to maintain the main transom in its rigid position during the summer months.

The display window frame 19 is formed with the metal or wood bars 20 and 21 and 22 and 23, the bar 20 being the top bar and fitting snugly in the groove 18 of the cross beam 16. The cross bar 24 divides the frame 19 into the base portion 25 and the sash portion 26, this sash portion being glazed with the single plate glass sheet 27. The base 25 is of metal, wood or such material as may be suitable for the ornamentation of the store front.

The side bar 22 of the frame 19 is secured to the mullion 30 by the screws 31, therefore the display frame 19 is secured firmly in place on the three sides and readily removable. The vertical bar 23 of the frame 19 is formed with a vertical groove 32 from the top to the bottom into which the entrance frame 33 is inserted by means of the tongue 34 projecting from the vertical bar of said entrance frame.

The entrance frame is of similar formation to the display frame 19 and also has a display plate glass while the base 35 corresponds to the base 25, this base may be considerably elaborated according to the construction of the store front but for purposes of this description it is thought better to describe the bases in as plain a manner as possible.

The door case 36 at its upper end fits into a grooved extension frame 37 from the cross beam 16 and has a cross bar 38 dividing the case for the door transom 39. The door 40 is hung in this case 36 and contains the plate glass 41. The door case is rigidly secured to the door sill 42 making a comparatively stiff frame throughout and this sill is secured to the floor by the screws 43. The vertical bars of the case 36 are grooved at 44 to receive the entrance frame 33 and the top bars of the entrance frame 33 are also inserted in corresponding grooves in the extension frame 37.

The other side of the store front, if there are two sides, is of precisely the same construction and like numerals indicate the corresponding parts.

The entrance frame in said door and case form a porch 45 having the ceiling 46 attached to the extension frame 37 which is considerably raised on the inside structure of the store as customary in deep set fronts.

It will now be seen that the store front may be removed piece by piece, naturally the glass can be removed if it is found desirable but this is not at all necessary as the whole front can be carefully removed and stored for the season in a place prepared for it, each section having its own compartment to keep it in the proper shape during the summer season and all that is necessary to remove the sections is to take the fastening screws out of the angle bar at the bottom of the display frame 19 and the screws out of the side bars 21 and then the front, by a very slight movement to the left or right as the case may be, will part from the entrance frame and be gently dropped out of the groove 18. The removal of the two display fronts 19 makes the removal of the two entrance sections 33 a very simple matter and all that is left is the door case.

The door case is removed by withdrawing the screws 43 and the case may be removed from the groove 18 with the door itself if it is found desirable to do so and both door and door case may occupy the same compartment in storage.

The front of the store is now completely open, therefore the window shelves 47 form a barrier. These window shelves may simply be tables with legs 48 and bodily removed to the side wall of the store for the display of vegetables or fruit or fish or other food stuffs.

These tables may have a water connection and a base as shown at 49 and in swinging the tables around to the new position, these water connections may have a flexible hose connection 50 which will permit the shifting of the table without disturbing the fountain arrangement 51 in the middle of the base for vegetables, fish or other perishable articles.

Figure 3:
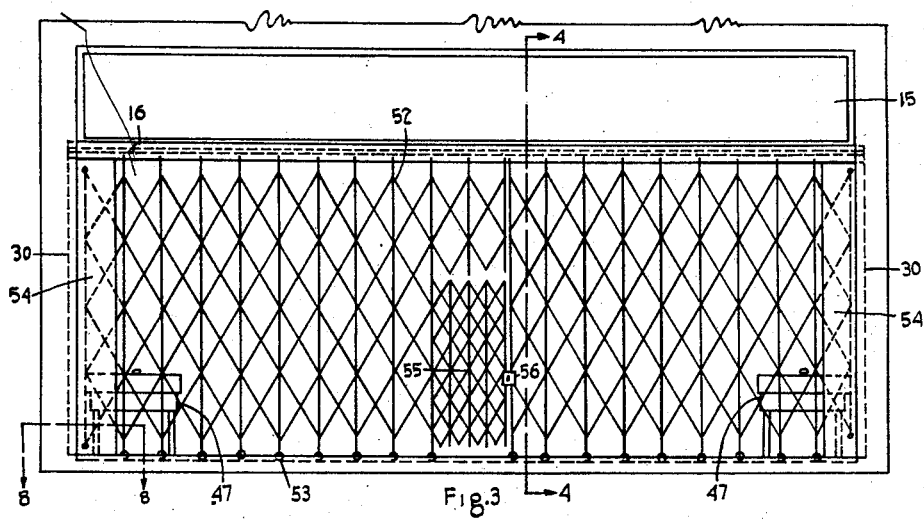
Figure 3 is an elevational view of the store front showing the night closure for the stall style of store.
Figure 4:
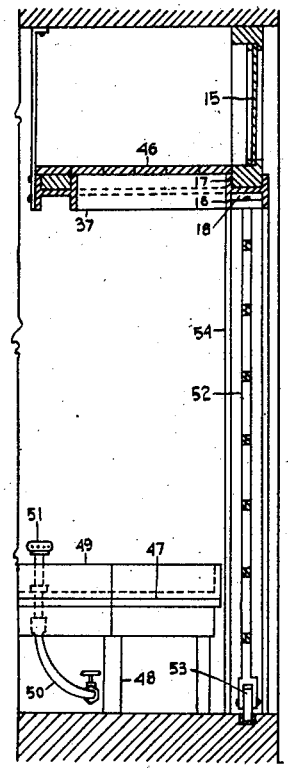
Figure 4 is a vertical sectional view on the lines 4—4 in Figure 3.
Figure 5:
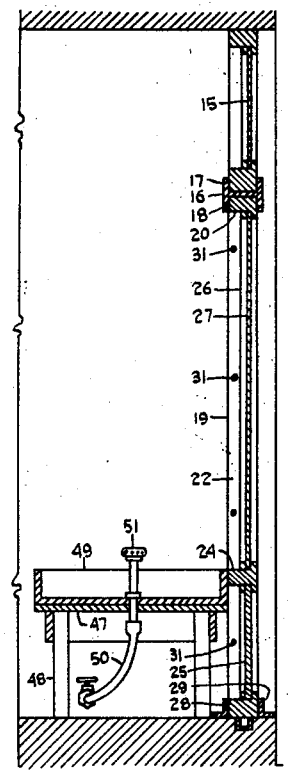
Figure 5 is a vertical sectional view on the lines 5—5 in Figure 1.
Figure 6:
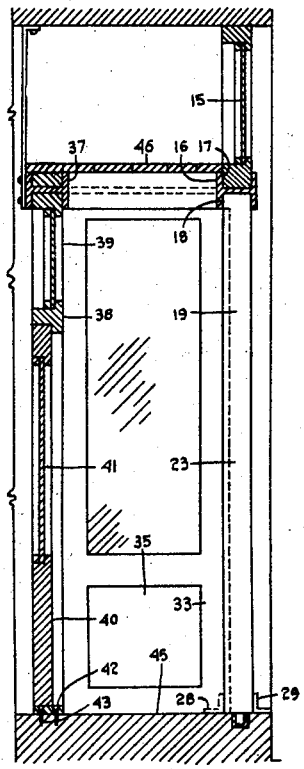
Figure 6 is a vertical sectional view on the lines 6—6 in Figure 1.
Figure 7:
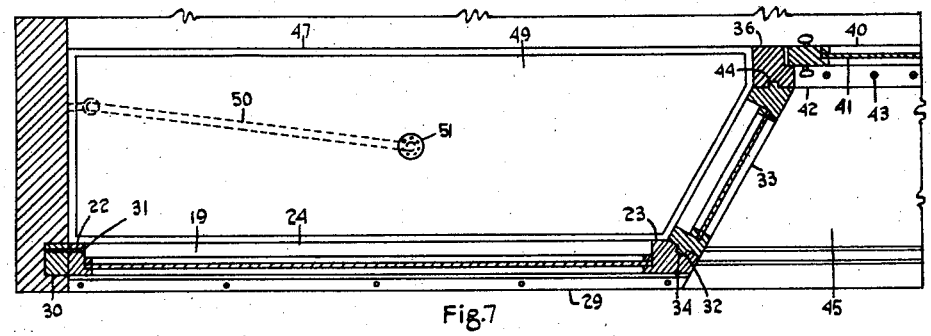
Figure 7 is a cross sectional view on the lines 7—7 in Figure 1.
Figure 8:
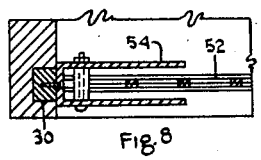
Figure 8 is a cross sectional view on the lines 8—8 in Figure 3.

The gate 52 is necessarily of the collapsible type of gate and the lazy tong principle will likely be found the most useful and in Figure 3 this gate is illustrated as running in small grooves across the store front on rollers 53 and to the groove 18 in the main cross beam 16, these gates being rigidly secured in the case 54 which are in turn rigidly secured to the mullion 30.

Therefore the gate forms a very secure closure and in one of the gates a minor gate 55 is made which is made to operate on the same principle, so that the main gate which is securely fastened by the locks 56 may also incude the fastening of the minor gate 55.

Thus the merchant may enter his store without opening the main gate.

What I claim is:

1. In convertible store fronts, a plurality of window sections having frames and glasses, a door case and door, a main transom and supporting cross beam suitably grooved to receive said frame, mullions having said frames secured thereto, floor fastenings for said frames, an extension frame from said cross beam for said door case and inwardly set members of said window sections and means for closing the stall opened by the removal of said frames and case.

2. In convertible store fronts, a plurality of window sections having frames and glass, angle bars supporting said frames at the lower end and detachable therefrom, a door casing door, a main transom and supporting cross beam suitably grooved to the ceiling of said frame, mullions having said frame secured thereto and an extension frame from said cross beam for said door case and inwardly set members of said window sections, and a grated frame adapted to replace said display front and having a gate.

3. In convertible store fronts, a plurality of window sections having frames and glass, angle bars supporting said frames at the lower end and detachable therefrom, a door casing door, a main transom and supporting cross beam suitably grooved to the ceiling of said frame, mullions having said frame secured thereto and an extension frame from said cross beam for said door case and inwardly set members of said window sections, a lazy tong gate adapted to replace the display front and having a permanent gate formed in lazy tong arrangement therewithin.

4. In convertible store fronts, a plurality of window sections having frames and glass, angle bars supporting said frames at the lower end and detachable therefrom, a door casing door, a main transom and supporting cross beam suitably grooved to the ceiling of said frame, mullions having said frame secured thereto and an extension frame from said cross beam for said door case and inwardly set members of said window sections, a toggle joint gate adapted to replace a display front and formed of two frames and slidably mounted, one of the toggle joint frames having a permanent gate therewithin formed of lazy tong arrangement.

Signed at Toronto, Canada, this 2nd day of July, 1931.

ANDREA SIMONE.